(12) United States Patent
Choi et al.

(10) Patent No.: US 11,012,654 B2
(45) Date of Patent: May 18, 2021

(54) IMAGE SENSOR AND IMAGE PROCESSING DEVICE INCLUDING THE SAME

(71) Applicants: SK hynix Inc., Gyeonggi-do (KR); RESERCH & BUSINESS FOUNDATION SUNGKYUNKWAN UNIVERSITY, Gyeonggi-do (KR)

(72) Inventors: Jae Hyuk Choi, Seoul (KR); Dong Uk Kim, Gyeonggi-do (KR)

(73) Assignees: SK hynix Inc., Gyeonggi-do (KR); RESERCH & BUSINESS FOUNDATION SUNGKYUNKWAN UNIVERSITY, Gyeonggi-do (KR)

(*) Notice: Subject to any disclaimer, the term of this patent is extended or adjusted under 35 U.S.C. 154(b) by 0 days.

(21) Appl. No.: 16/865,892

(22) Filed: May 4, 2020

(65) Prior Publication Data
US 2021/0112216 A1    Apr. 15, 2021

(30) Foreign Application Priority Data
Oct. 15, 2019  (KR) .................. 10-2019-0127584

(51) Int. Cl.
*H04N 5/376* (2011.01)
*H04N 5/378* (2011.01)
*H04N 5/341* (2011.01)

(52) U.S. Cl.
CPC .......... *H04N 5/3765* (2013.01); *H04N 5/341* (2013.01); *H04N 5/378* (2013.01)

(58) Field of Classification Search
CPC ...... H04N 5/3765; H04N 5/341; H04N 5/378; G01S 7/4817; G01S 7/486; G01S 7/4865
See application file for complete search history.

(56) References Cited

U.S. PATENT DOCUMENTS

| | | | |
|---|---|---|---|
| 2006/0215010 A1* | 9/2006 | Ohki | H04N 1/40037 347/251 |
| 2017/0356981 A1* | 12/2017 | Yang | G01S 7/4868 |
| 2019/0193267 A1* | 6/2019 | Peng | B25J 9/1676 |
| 2019/0383917 A1* | 12/2019 | Shinozuka | G01S 7/4865 |
| 2020/0026031 A1* | 1/2020 | Li | G01S 17/86 |
| 2020/0217965 A1* | 7/2020 | Calder | G01S 7/4865 |
| 2020/0284883 A1* | 9/2020 | Ferreira | G01S 7/4863 |

FOREIGN PATENT DOCUMENTS

| | | |
|---|---|---|
| KR | 10-2015-0011922 | 2/2015 |
| KR | 10-2015-0087032 | 7/2015 |

* cited by examiner

*Primary Examiner* — Nhan T Tran
(74) *Attorney, Agent, or Firm* — IP & T Group LLP

(57) ABSTRACT

An image sensor includes a pixel array configured to receive a driving signal, sense a light signal reflected from an object in response to the driving signal, and generate pixel clock signals indicating delay of the driving signal; a reference clock circuit configured to generate a reference clock signal; and a time-to-analog convert circuit configured to convert delay times between the pixel clock signals and the reference clock signal into analog values.

20 Claims, 4 Drawing Sheets

IMAGE SENSOR AND IMAGE PROCESSING DEVICE INCLUDING THE SAME

CROSS-REFERENCE TO RELATED APPLICATION

This application claims priority under 35 U.S.C. § 119 to Korean Patent Application No. 10-2019-0127584, filed on Oct. 15, 2019, which is incorporated herein by reference in its entirety.

BACKGROUND

1. Field

Various embodiments relate to an image sensor, and more particularly, to an image sensor for correcting a depth error and an image processing device including the same.

2. Discussion of the Related Art

Recently, more and more research has been conducted on a capturing device capable of acquiring distance information from an object. In particular, a three-dimensional (3D) display device has been developed, which can display a depth image. As 3D display technology continues to develop and products incorporating such technology increase in demand, 3D content has emerged as an important issue.

Depth information on distances between surfaces of an object and a capturing device may be obtained through Time of Flight (TOF) method. There are generally two types of the TOF method: a direct TOF method and an indirect TOF method. The direct TOF method acquires depth information of an object by emitting an infrared signal to the object and detecting a time difference between transmission of the infrared signal and receipt of an infrared signal reflected from the object. The indirect TOF method acquires depth information of an object by emitting an infrared signal to the object and detecting a phase difference between the transmitted infrared signal and an infrared signal reflected from the object.

Such a capturing device includes an image sensor, which includes a pixel array having a plurality of pixels arranged therein and a driver configured to provide a driving signal to the pixel array.

Due to a structural limit of the image sensor, however, the driver is inevitably disposed only on one side or both sides of the pixel array within the image sensor, and delay occurs when a driving signal generated by the driver travels far from the driver. The delay causes a change in the ratio of charge stored in each of the pixels, resulting in a depth error of a depth image.

SUMMARY

Various embodiments are directed to an image sensor for correcting a depth error caused by delay of a driving signal, and an image processing device including the same.

In an embodiment, an image sensor may include: a pixel array configured to receive a driving signal, sense a light signal reflected from an object in response to the driving signal, and generate pixel clock signals indicating delay of the driving signal; a reference clock circuit configured to generate a reference clock signal; and a time-to-analog convert circuit configured to convert delay times between the pixel clock signals and the reference clock signal into analog values.

In another embodiment, an image processing device may include: an IR emitter configured to emit a light signal with a set frequency to an object; an image sensor configured to receive a driving signal, sense a light signal reflected from the object in response to the driving signal, and generate compensation data for compensating for delay of the driving signal; and a processor configured to acquire a depth image based on a phase difference between the light signal and the reflected light signal, and generate a corrected depth image by correcting depth values of the depth image based on the compensation data.

In an embodiment, an operating method of a device including a sensor, the operating method comprising: emitting a source light signal toward an object; sensing, by the sensor, a reflected light signal reflected by the object; acquiring a depth image based on a difference between the source and reflected light signals; generating, by the sensor, compensation data to compensate for a delay of the sensor; and correcting a depth value of the depth image based on the compensation data.

In accordance with the present embodiments, the image sensor and the image processing device can measure a delay value of the driving signal by an internal delay factor of the image sensor, convert the measured delay value into digital data, and provide the digital data to the processor.

Furthermore, the image sensor and the image processing device can correct a depth error caused by the delay of the driving signal by the internal delay factor of the image sensor, and thus measure an accurate TOF of the driving signal.

The image sensor and the image processing device can accurately calculate a distance from an object, thereby acquiring a depth image whose depth error is corrected.

DETAILED DESCRIPTION

Figure 1:
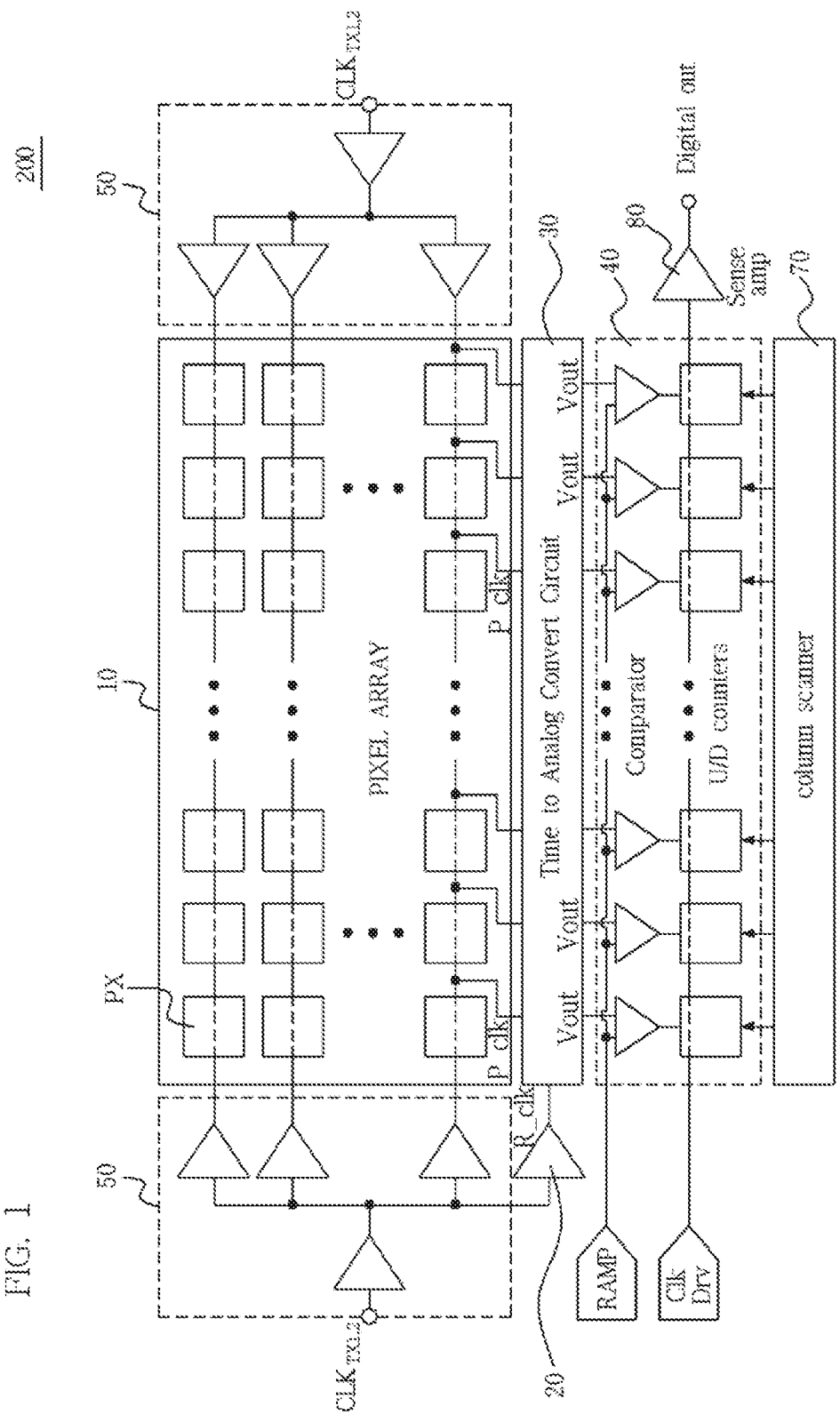
FIG. 1 is a block diagram of an image sensor in accordance with an embodiment of the present disclosure.

Various embodiments of the present disclosure are described below with reference to the accompanying drawings such that the present invention can be easily carried out and practiced by those skilled in the art to which the present invention pertains. Like reference numerals identify like elements throughout the drawings. Also, throughout the specification, reference to "an embodiment," "another embodiment" or the like is not necessarily to only one embodiment, and different references to any such phrase are not necessarily to the same embodiment(s).

Detailed description of well-known functions and configurations is omitted so as not to unnecessarily obscure subject matter of the present invention.

The terms such as first and second are used to identify various components, but the components are not limited by the terms. Rather, such terms are used only to distinguish one component from another component that otherwise have the same or similar names.

An embodiment of the present disclosure provides an image sensor which can measure a delay value of a driving signal caused by an internal delay factor of the image sensor and may provide the measured delay value as digital data.

Another embodiment of the present disclosure provides an image processing device which can accurately measure Time of Flight (TOF) of a driving signal by correcting a depth error caused by delay of the driving signal which may, in turn, be caused by an internal delay factor of an image sensor, and calculate an accurate distance from an object to acquire a depth image whose depth error is corrected.

FIG. 1 is a block diagram of an image sensor 200 in accordance with an embodiment of the present disclosure.

Referring to FIG. 1, the image sensor 200 includes a pixel array 10, a reference clock circuit 20, a time-to-analog convert circuit 30, an analog-to-digital convert circuit 40, a first balanced tree circuit 50, a column scanner 70 and a sense amplifier 80.

The pixel array 10 includes row signal lines, column signal lines and a plurality of pixels PX. The pixels PX may include photodiodes (not illustrated) configured to detect a light signal, and driving transistors and capacitors (not illustrated) configured to store charge according to a driving signal $CLK_{TX1,2}$.

In the pixel array 10, the driving signal $CLK_{TX1,2}$ may be delayed by an internal delay factor such as RC delay of the row signal lines and the column signal lines. The pixel array 10 outputs pixel clock signals P_clk indicating the delay of the driving signal $CLK_{TX1,2}$ to the time-to-analog convert circuit 30.

The driving signal $CLK_{TX1,2}$ may be applied to the pixel array 10 in order to detect a light signal reflected from an object. The driving signal $CLK_{TX1,2}$ may include a first driving signal $CLK_{TX1}$ and a second driving signal $CLK_{TX2}$ which have different phases. For example, the first driving signal and the second driving signal may have a phase difference of 180°. The first driving signal $CLK_{TX1}$ and the second driving signal $CLK_{TX2}$ may be applied to the driving transistors included in the pixels of the pixel array 10 and may be used to store charge according to the light signal.

The reference clock circuit 20 provides a reference clock signal R_clk to the time-to-analog convert circuit 30. The reference clock circuit 20 may include one or more delay cells configured to generate the reference clock signal R_clk by delaying the driving signal $CLK_{TX1,2}$. Furthermore, the delay time of the delay cell is variable and may be set to any suitable delay time.

The time-to-analog convert circuit 30 receives the pixel clock signals P_clk transferred from the column signal lines of the pixel array 10, and receives the reference clock signal R_clk provided from the reference clock circuit 20. The time-to-analog convert circuit 30 converts delay times between the pixel clock signals P_clk and the reference clock signal R_clk into analog values.

The time-to-analog convert circuit 30 includes time-to-analog converters (TACs) connected one-to-one to the column signal lines. The detailed configuration of the TAC are described below with reference to FIGS. 2 and 3.

The analog-to-digital convert circuit 40 converts the analog values outputted from the time-to-analog convert circuit 30 into digital data. The analog values corresponding to the delay times between the pixel clock signals P_clk and the reference clock signal R_clk are converted into digital data by the analog-to-digital convert circuit 40.

For example, the analog-to-digital convert circuit 40 may include comparators and up/down (U/D) counters. The analog-to-digital convert circuit 40 may convert the analog values Vout into digital signals using a ramp signal RAMP. The ramps signal RAMP may rise or fall with a constant slope. Each of the comparators may compare the ramp signal RAMP and an output signal Vout of the time-to-analog convert circuit 30 and may output a comparison signal. Each of the U/D counters may receive a clock signal ClkDrv and count the clock signal ClkDrv until the comparison signal transitions. In this way, the analog-to-digital convert circuit 40 may convert the analog output signal Vout into digital data. Description of the detailed operation of the analog-to-digital convert circuit 40, which is known by those skilled in the art, is omitted herein for clarity.

The first balanced tree circuit 50 transfers the driving signal $CLK_{TX1,2}$ provided from a driver (not illustrated) to the row signal lines of the pixel array 10. For example, the first balanced tree circuit 50 may be disposed on both sides of the pixel array 10.

The column scanner 70 provides the analog-to-digital convert circuit 40 with a select signal for selecting one or more of the column signal lines of the pixel array 10. The analog-to-digital convert circuit 40 converts an analog value Vout of a column signal line, selected in response to the select signal of the column scanner 70, into digital data.

The sense amplifier 80 senses and amplifies the digital data converted by the analog-to-digital convert circuit 40, and outputs the amplified digital data to the outside.

Figure 2:
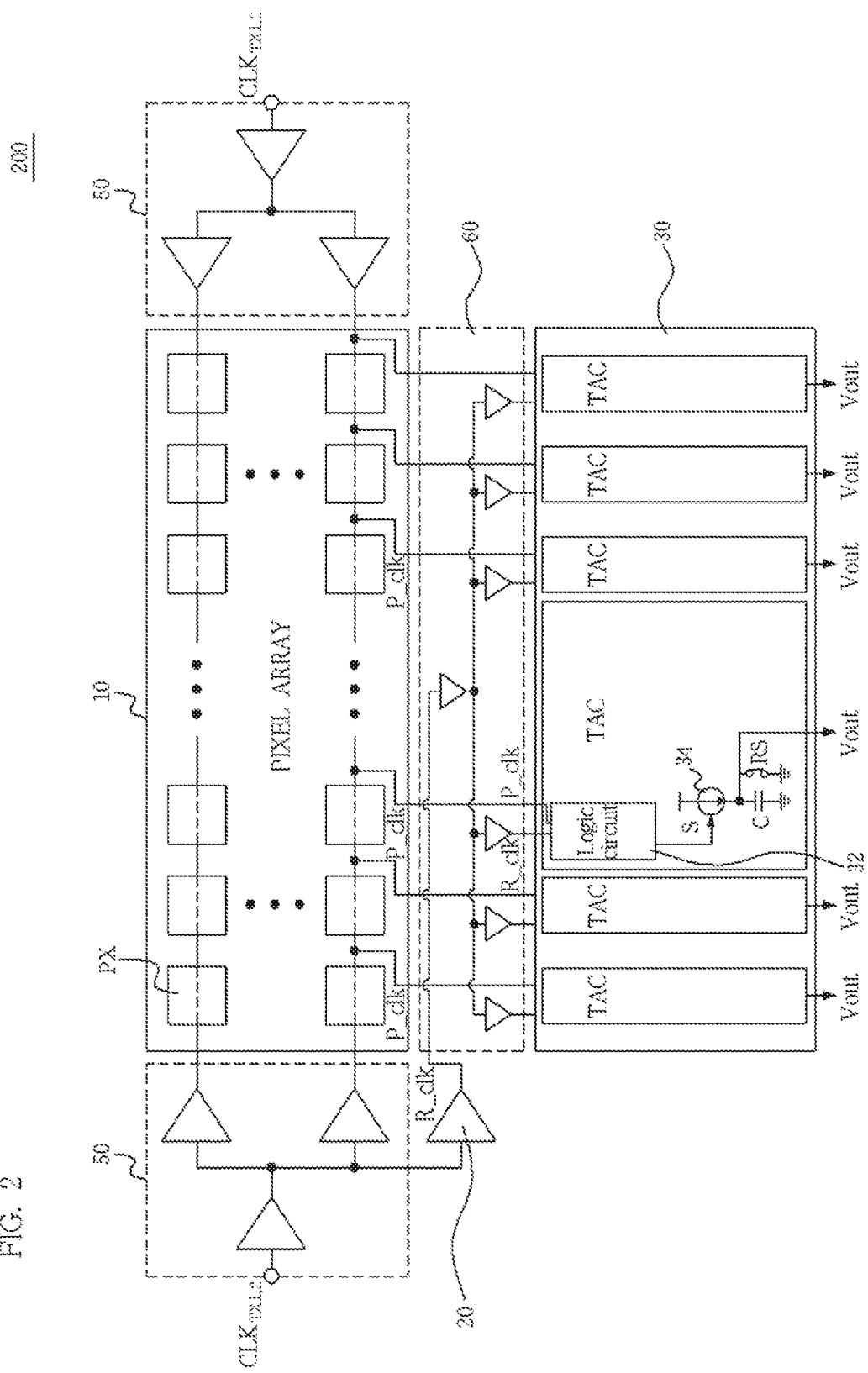
FIG. 2 is a detailed block diagram of an image sensor in accordance with an embodiment of the present disclosure.
Figure 3:
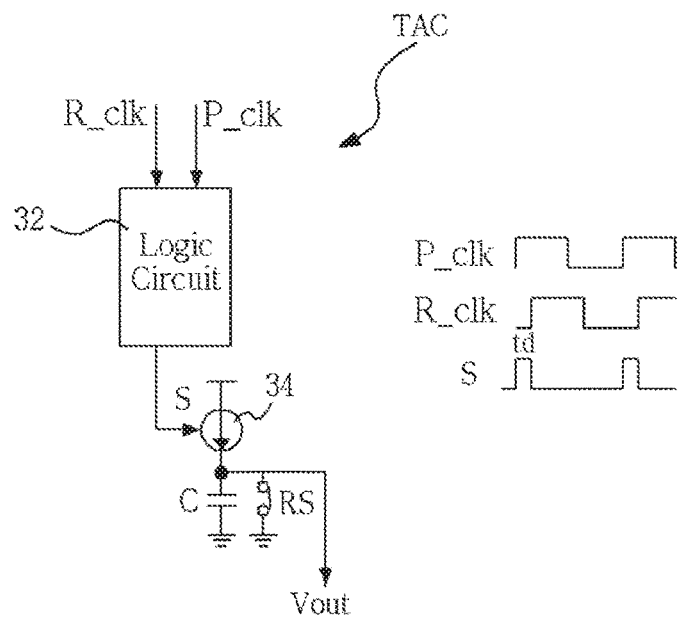
FIG. 3 is an internal circuit diagram and operation timing diagram of a time-to-analog converter (TAC), such as that of FIG. 2.

FIG. 2 is a detailed block diagram of the image sensor 200 in accordance with an embodiment of the present disclosure, and FIG. 3 is an internal circuit diagram and operation timing diagram of the TAC of FIG. 2.

Referring to FIG. 2, the image sensor 200 further includes a second balanced tree circuit 60.

The second balanced tree circuit 60 is connected between the reference clock circuit 20 and the time-to-analog convert circuit 30. The second balanced tree circuit 60 transfers the reference clock signal R_clk provided from the reference clock circuit 20 to the TACs of the time-to-analog convert circuit 30.

The TACs of the time-to-analog convert circuit 30 are connected one-to-one to the column signal lines.

The detailed configuration and operation of the TAC is described as follows.

Referring to FIGS. 2 and 3, each of the TACs includes a logic circuit 32, a current source 34, a charge pump C and a reset switch RS.

The logic circuit 32 receives the reference clock signal R_clk and the pixel clock signal P_clk transferred through a corresponding column signal line of the pixel array 10, and generates a strobe signal S by performing a logic operation on the pixel clock signal P_clk and the reference clock signal R_clk.

The logic circuit 32 enables the strobe signal S for a delay time td between the pixel clock signal P_clk and the reference clock signal R_clk.

For example, the logic circuit 32 may be configured as a pulse generator (not illustrated) configured to generate a pulse signal with a pulse width corresponding to the delay time by performing a logic operation on the pixel clock signal P_clk and the reference clock signal R_clk.

The current source 34 supplies a current in response to the strobe signal S. For example, the current source 34 may be configured as a transistor (not illustrated). Such a transistor supplies a constant current to the charge pump C when turned on in response to the strobe signal S.

The charge pump C stores charge through the current supplied from the current source 34. The charge stored in the charge pump C may be represented as an analog value corresponding to a delay time caused by RC delay within the pixel array.

The reset switch RS serves to reset the charge stored in the charge pump C when turned on.

Each of the TACs may convert the delay time caused by the RC delay into an analog voltage. Each of the TACs provides the analog voltage as the output signal Vout to the analog-to-digital convert circuit 40.

Figure 4:
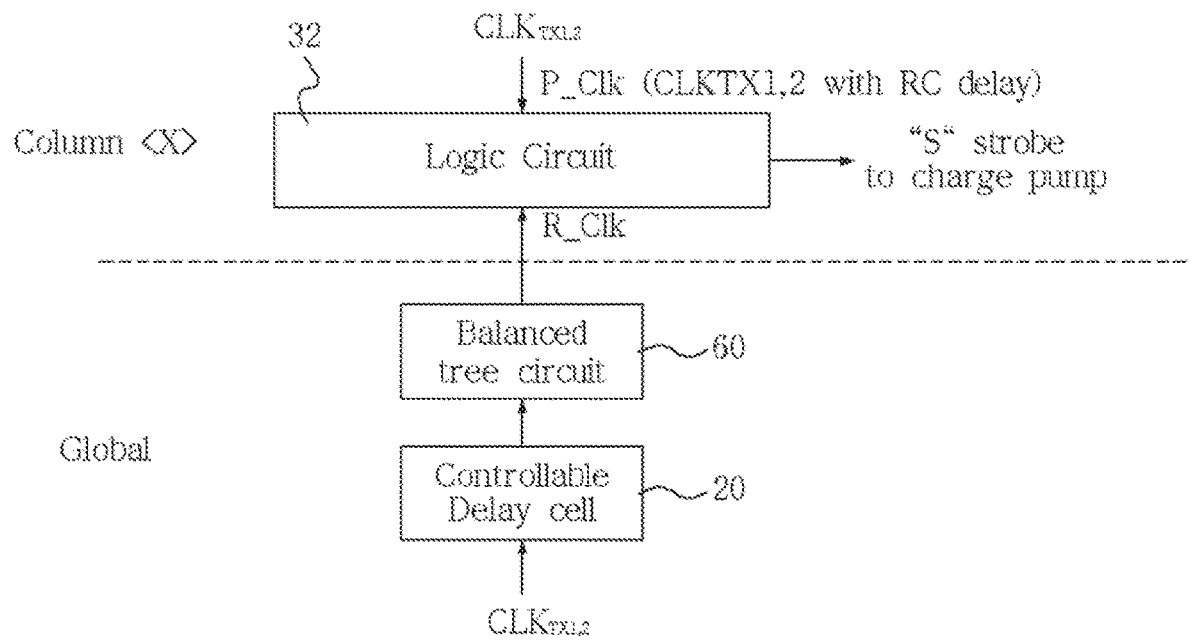
FIG. 4 is a diagram illustrating an operation of a TAC, such as that of FIG. 2, in accordance with an embodiment of the present disclosure.

FIG. 4 is a diagram illustrating an operation of the TAC in accordance with an embodiment of the present disclosure.

Referring to FIG. 4, the logic circuit 32 receives the pixel clock signal P_clk and the reference clock signal R_clk. In FIG. 4, Column <X> indicates an $X^{th}$ column signal line among the column signal lines, and Global indicates a global signal line that transfers the reference clock signal R_clk to each of the TACs.

Referring to FIGS. 3 and 4, the logic circuit 32 of the TAC receives the pixel clock signal P_clk and the reference clock signal R_clk, and generates the strobe signal S by performing a logic operation on the pixel clock signal P_clk and the reference clock signal R_clk. Such a strobe signal S turns on the current source 34 to charge the charge pump C with a current supplied from the current source 34.

The pixel clock signal P_clk is transferred to the logic circuit 32 of the TAC through the column signal line of the pixel array 10. The pixel clock signal P_clk indicates delay of the driving signal $CLK_{TX1,2}$ caused by an internal delay factor of the pixel array 10.

The reference clock signal R_clk is a signal transferred to the logic circuit 32 of the TAC through the second balanced tree circuit 60.

The reference clock signal R_clk is generated by delaying the driving signal $CLK_{TX1,2}$ through the delay cells of the reference clock circuit 20. The delay amount of the delay cells may be controllably set, and the reference clock signal R_clk may be used as a reference signal for detecting the delay amount of the internal delay factor of the pixel array 10.

Figure 5:
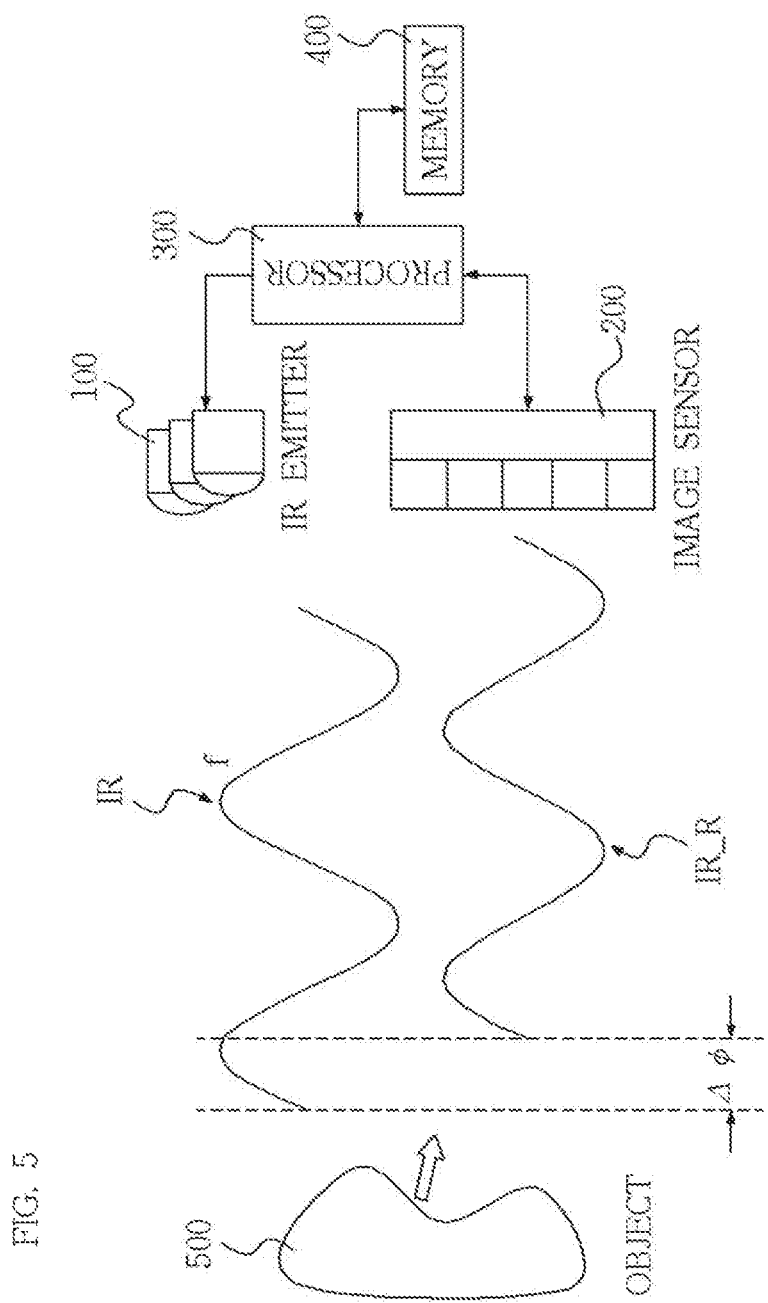
FIG. 5 is a block diagram of an image processing device in accordance with an embodiment of the present disclosure.

FIG. 5 is a block diagram of an image processing device in accordance with an embodiment of the present disclosure.

Referring to FIG. 5, the image processing device includes an infrared (IR) emitter 100, an image sensor 200, a processor 300 and a memory 400.

The IR emitter 100 emits a light signal IR with a set frequency to an object 500. For example, the IR emitter 100 may emit an infrared signal to the object 500.

The image sensor 200 senses a light signal IR_R reflected from the object and generates compensation data for compensating for the delay of the driving signal $CLK_{TX1,2}$ caused by an internal delay factor of the pixel array 10. As illustrated in FIG. 1, the image sensor 200 includes the pixel array 10, the reference clock circuit 20 and the time-to-analog convert circuit 30. The image sensor 200 may be configured to operate as described with reference to FIGS. 1 to 4.

The processor 300 controls the IR emitter 100 and the image sensor 200. The processor 300 may acquire a depth image of the object 500 based on a phase difference $\Delta\phi$ between the light signal IR and the reflected light signal IR_R and the frequency f of the light signal IR. Description of an algorithm for computing the depth image of the object using the phase difference $\Delta\phi$, which is known by those skilled in the art, is omitted for clarity.

The processor 300 may generate a corrected depth image by correcting depth values of the depth image based on the compensation data for compensating for the delay of the driving signal $CLK_{TX1,2}$ caused by the internal delay factor of the image sensor 200.

The memory 400 may store the compensation data and the corrected depth image. The memory 400 may store data for operation and control of the processor 300.

As described above, embodiments may measure the delay value of the driving signal which may be caused by the internal delay factor of the image sensor 200, convert the measured delay value into digital data, and provide the digital data to the processor 300.

Furthermore, embodiments can correct a depth error caused by the delay of the driving signal caused by the internal delay factor of the image sensor, and thus measure an accurate TOF of the driving signal.

Furthermore, embodiments can accurately calculate a distance from an object, thereby acquiring a depth image whose depth error is corrected.

Although various embodiments have been illustrated and described, it will be apparent to those skilled in the art in light of the present disclosure that various changes and modifications may be made without departing from the spirit and scope of the invention. The present invention encompasses all such changes and modifications to the extent they fall within the scope of the following claims.

What is claimed is:

1. An image sensor comprising:
   a pixel array configured to receive a driving signal, sense a light signal reflected from an object in response to the driving signal, and generate pixel clock signals indicating delay of the driving signal;
   a reference clock circuit configured to generate a reference clock signal; and
   a time-to-analog convert circuit configured to convert delay times between the pixel clock signals and the reference clock signal into analog values.

2. The image sensor of claim 1, wherein the time-to-analog convert circuit comprises Time-to-Analog Converters (TACs) connected one-to-one to column signal lines of the pixel array.

3. The image sensor of claim 2, wherein each of the TACs comprises:
   a logic circuit configured to generate a strobe signal by performing a logic operation on the pixel clock signal and the reference clock signal;
   a current source configured to supply a current in response to the strobe signal; and
   a charge pump configured to store charge through the current.

4. The image sensor of claim 3, wherein the logic circuit enables the strobe signal for the delay time between a corresponding pixel clock signal and the reference clock signal.

5. The image sensor of claim 1, further comprising an analog-to-digital convert circuit configured to convert the analog values into digital values.

6. The image sensor of claim 1, further comprising a first balanced tree circuit configured to transfer the driving signal to the pixel array.

7. The image sensor of claim 1, wherein the reference clock circuit comprises a delay cell configured to generate the reference clock signal by delaying the driving signal.

8. The image sensor of claim 7, wherein a delay time of the delay cell is set to any of multiple times.

9. The image sensor of claim 7, further comprising a second balanced tree circuit configured to transfer the reference clock signal to each of the TACs.

10. An image processing device comprising:
an IR emitter configured to emit a light signal with a set frequency to an object;
an image sensor configured to receive a driving signal, sense a light signal reflected from the object in response to the driving signal, and generate compensation data for compensating for delay of the driving signal; and
a processor configured to acquire a depth image based on a phase difference between the light signal and the reflected light signal, and generate a corrected depth image by correcting depth values of the depth image based on the compensation data.

11. The image processing device of claim 10, wherein the image sensor comprises:
a pixel array configured to receive the driving signal, sense a light signal reflected from the object in response to the driving signal, and generate pixel clock signals indicating the delay;
a reference clock circuit configured to generate a reference clock signal; and
a time-to-analog convert circuit configured to convert delay times between the pixel clock signals and the reference clock signal into analog values.

12. The image processing device of claim 11, wherein the time-to-analog convert circuit comprises Time-to-Analog Converters (TACs) connected one-to-one to column signal lines of the pixel array.

13. The image processing device of claim 12, wherein each of the TACs comprises:
a logic circuit configured to generate a strobe signal by performing a logic operation on the pixel clock signal and the reference clock signal;
a current source configured to supply a current in response to the strobe signal; and
a charge pump configured to store charge through the current.

14. The image processing device of claim 13, wherein the logic circuit enables the strobe signal for the delay time between a corresponding pixel clock signal and the reference clock signal.

15. The image processing device of claim 11, wherein the image sensor further comprises an analog-to-digital convert circuit configured to convert the analog values into digital values.

16. The image processing device of claim 11, wherein the image sensor further comprises a first balanced tree circuit configured to transfer the driving signal to the pixel array.

17. The image processing device of claim 11, wherein the reference clock circuit comprises a delay cell configured to generate the reference clock signal by delaying the driving signal.

18. The image processing device of claim 17, wherein a delay time of the delay cell is set to any of multiple times.

19. The image processing device of claim 17, wherein the image sensor further comprises a second balanced tree circuit configured to transfer the reference clock signal to each of the TACs.

20. An operating method of a device including a sensor, the operating method comprising:
emitting a source light signal toward an object;
sensing, by the sensor, a reflected light signal reflected by the object;
acquiring a depth image based on a difference between the source and reflected light signals;
generating, by the sensor, compensation data to compensate for a delay of the sensor; and
correcting a depth value of the depth image based on the compensation data.

* * * * *